(12) United States Patent
Armstrong et al.

(10) Patent No.: US 9,882,513 B2
(45) Date of Patent: Jan. 30, 2018

(54) SYNCHRONIZING MOTORS FOR AN ELECTRIC PROPULSION SYSTEM

(71) Applicants: Rolls-Royce North American Technologies, Inc., Indianapolis, IN (US); Rolls-Royce Corporation, Indianapolis, IN (US)

(72) Inventors: Michael James Armstrong, Avon, IN (US); Mark Jon Blackwelder, Plainfield, IN (US); Andrew Mark Bollman, Plainfield, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 15/173,908

(22) Filed: Jun. 6, 2016

(65) Prior Publication Data
US 2016/0365810 A1 Dec. 15, 2016

Related U.S. Application Data

(60) Provisional application No. 62/173,690, filed on Jun. 10, 2015.

(51) Int. Cl.
*H02P 25/30* (2006.01)
*H02P 3/18* (2006.01)
(Continued)

(52) U.S. Cl.
CPC .............. *H02P 3/18* (2013.01); *B60L 3/0061* (2013.01); *B60L 11/08* (2013.01);
(Continued)

(58) Field of Classification Search
CPC .............. H03L 7/0891; B60L 2220/14; B60L 2220/42; H02P 5/74
See application file for complete search history.

(56) References Cited

U.S. PATENT DOCUMENTS 2,720,927 A 10/1955 Mergen et al.
2,794,507 A 6/1957 Banning, Jr.
(Continued)

FOREIGN PATENT DOCUMENTS

DE 2623659 A1 12/1976
EP 2581308 A2 4/2013
(Continued)

OTHER PUBLICATIONS

Extended Search Report from counterpart European Application No. 16173171.6, dated Oct. 20, 2016, 12 pp.
(Continued)

*Primary Examiner* — Karen Masih
(74) *Attorney, Agent, or Firm* — Shumaker & Sieffert, P.A.

(57) ABSTRACT

An electric propulsion system is described that includes an AC drive circuit, a synchronization circuit, and a control unit. The AC drive circuit includes a plurality of propulsor motors, an AC power bus, and an AC generator that delivers AC electrical power to the AC power bus for simultaneously driving the plurality of propulsor motors. The synchronization circuit is configured to synchronize, with the AC generator, single propulsor motor from the plurality of propulsor motors, at a time. The control unit is configured to maintain synchronicity between the single propulsor motor and the AC generator by engaging the synchronization circuit with the single propulsor motor in response to determining that the single propulsor motor is not synchronized with the AC generator.

20 Claims, 6 Drawing Sheets

(51) Int. Cl.
*B60L 3/00* (2006.01)
*B60L 11/08* (2006.01)
*B60L 15/20* (2006.01)
*H02P 5/74* (2006.01)
*B63H 21/17* (2006.01)

(52) U.S. Cl.
CPC .......... *B60L 15/2072* (2013.01); *B63H 21/17* (2013.01); *H02P 5/74* (2013.01); *B60L 2200/10* (2013.01); *B60L 2200/32* (2013.01); *B60L 2220/42* (2013.01); *B60L 2240/421* (2013.01); *B60L 2240/427* (2013.01); *Y02T 10/644* (2013.01); *Y02T 10/645* (2013.01); *Y02T 10/648* (2013.01); *Y02T 10/70* (2013.01); *Y02T 10/7077* (2013.01); *Y02T 10/72* (2013.01); *Y02T 10/7275* (2013.01)

(56) References Cited

U.S. PATENT DOCUMENTS

| | | | |
|---|---|---|---|
| 3,007,529 | A | 11/1961 | Brockert et al. |
| 3,066,741 | A | 12/1962 | Barnes |
| 4,338,525 | A | 7/1982 | Kilgore |
| 4,409,533 | A | 10/1983 | Kawabata |
| 4,958,289 | A | 9/1990 | Sum et al. |
| 5,629,567 | A | 5/1997 | Kumar |
| 7,802,757 | B2 | 9/2010 | Dooley et al. |
| 8,299,638 | B2* | 10/2012 | Sandoy ............... B63H 23/24 290/4 R |
| 8,354,768 | B2 | 1/2013 | Cipriani |
| 8,552,575 | B2 | 10/2013 | Teets et al. |
| 8,622,002 | B2 | 1/2014 | Jokel |
| 8,727,271 | B2 | 5/2014 | Salyer |
| 2007/0293104 | A1 | 12/2007 | Sandoy et al. |
| 2010/0274420 | A1 | 10/2010 | Veit et al. |
| 2011/0080040 | A1 | 4/2011 | Kumar |
| 2012/0101671 | A1* | 4/2012 | Caouette ............... B63H 21/17 701/21 |
| 2014/0203739 | A1 | 7/2014 | Chantriaux et al. |
| 2014/0346283 | A1 | 11/2014 | Salyer |

FOREIGN PATENT DOCUMENTS

| | | |
|---|---|---|
| JP | 69218370 | 8/1984 |
| JP | 61157280 | 7/1986 |
| JP | 2000228898 | 8/2000 |
| WO | 0126962 A1 | 4/2001 |
| WO | 2005006536 A1 | 1/2005 |
| WO | 2006037412 A1 | 4/2006 |

OTHER PUBLICATIONS

Response to Search Report dated Oct. 20, 2016, from counterpart European Application No. 16173171.6, filed May 31, 2017, 8 pp.
Cast, "Propeller Operation and Malfunctions Basic Familiarization for Flight Crews", SKYbrary Bookshelf, 2011, Retrieved from http://skybrary.aero/bookshelf/content/bookDetails.php?bookId=3703, 16 pgs.
Examination Report from counterpart European Application No. 16173171.6, dated Oct. 13, 2017, 10 pp.
Berg et al., "HTS Electrical System for a Distributed Propulsion Aircraft," IEEE Transactions on Applied Superconductivity, vol. 25, No. 3, Jun. 2015, 5 pp.

* cited by examiner

SYNCHRONIZING MOTORS FOR AN ELECTRIC PROPULSION SYSTEM

This application claims the benefit of U.S. Provisional Application No. 62/173,690 filed Jun. 10, 2015, the entire content of which is hereby incorporated by reference.

BACKGROUND

Some aircraft and marine craft use turbo electric distributed propulsion (TeDP) systems for distributing electrical power from onboard generators, to one or more propulsors. Each propulsor may include a motor for driving a propeller or fans that spin at a certain speed so as to positively affect aerodynamic and hydrodynamic performance of the vehicle. The electrical power that drives each propulsor motor may come from a generator that is driven by a turboshaft engine.

When a TeDP system relies on a DC distribution system for distributing electrical power from an AC generator to one or more AC propulsor motors, the TeDP system may rely on dedicated inverters located at each propulsor motor that convert the output of the DC distribution system back to an appropriate amount of AC electrical power for powering the propulsor. Each dedicated inverter may suffer from an undesirably large mass and weight. Additionally, each rectification to DC and the dedicated inverters introduce undesirable losses into the system which leads to system inefficiency and increase thermal loads.

Some TeDP systems try to avoid the large mass and weight attributed to dedicated inverters by driving each propulsor motor, directly, with the variable frequency, AC power that comes from the generator. For example, some TeDP systems forgo the use of a DC distribution system and associated inverters and instead, rely on a variable frequency, AC microgrid that distributes electrical power to the propulsor motors, directly from the turbo generator. Despite saving size and weight, powering propulsor motors directly using an AC microgrid distribution system may come with challenges. For example, each propulsor motor must maintain speed synchronicity with the generator, both during start-up, and during transient loading of the propulsor. If synchronicity between the generator and propulsor motors is lost (e.g., due to a torque spike), the TeDP system may be unable to drive the propulsor fans or propellers and the aircraft or marine craft may lose thrust.

SUMMARY

In one example, the disclosure is directed to an electric propulsion system with an AC drive circuit including a plurality of propulsor motors, an AC power bus, and an AC generator that delivers AC electrical power to the AC power bus for simultaneously driving the plurality of propulsor motors. The electric propulsion system further includes a synchronization circuit configured to synchronize, with the AC generator, a single propulsor motor from the plurality of propulsor motors, at a time, and a control unit configured to maintain synchronicity between the single propulsor motor and the AC generator by engaging the synchronization circuit with the single propulsor motor in response to determining that the single propulsor motor is not synchronized with the AC generator.

In another example, the disclosure is directed to an electric propulsion system that includes means for determining that a single propulsor motor from a bank of propulsor motors is not synchronized with a generator, means for disengaging only the single propulsor motor from the generator, and means for engaging only the single propulsor motor with a synchronization circuit shared by the bank of propulsor motors. The electric propulsion system further includes means for determining that the single propulsor motor is synchronized with the generator, means for disengaging the single propulsor motor from the synchronization circuit, and means for engaging the single propulsor motor with the generator.

In one example, the disclosure is directed to a method that includes responsive to determining that a single propulsor motor from a bank of propulsor motors of an electric propulsion system is not synchronized with a generator of the electric propulsion system, engaging, by the control unit, only the single propulsor motor with a synchronization circuit of the electric propulsion system that is shared by the bank of propulsor motors, and responsive to determining that the single propulsor motor is synchronized with the generator, disengaging, by the control unit, the single propulsor motor from the synchronization circuit.

The details of one or more examples are set forth in the accompanying drawings and the description below. Other features, objects, and advantages of the disclosure will be apparent from the description and drawings, and from the claims.

DETAILED DESCRIPTION

In general, techniques and circuits of this disclosure may enable an electric propulsion system, such as a turbo electric distributed power (TeDP) system on an aircraft or marine craft, to individually synchronize multiple propulsors with a shared power source (e.g., a generator), using a single, low-power synchronization circuit (referred to simply as a "synch circuit"). Rather than utilize high-power synchronization circuitry that can handle the simultaneous starting and synching of multiple propulsors, the system uses an intelligent low-power synch circuit that is sized for starting and synching a single propulsor at a time. Over time, the single low-power synch circuit is configured to engage and assist each propulsor independently, as each propulsor may fall out of synch (e.g., due to torque spikes) with the shared power source.

In some examples, the techniques and circuits may be applicable for both fixed and variable speed power sources and both fixed and variable pitch propellers or fans. The system may manage the variable pitch levels and variable speed levels when determining whether the propulsor motors and AC generator are synchronized or not. In addition, in some examples, the system may coordinate with other components or systems, such as power source controls, and other controllers for obtaining appropriate operating speeds, such as a specific generator speed during startup that is preferable for synchronization and startup time.

Figure 1:
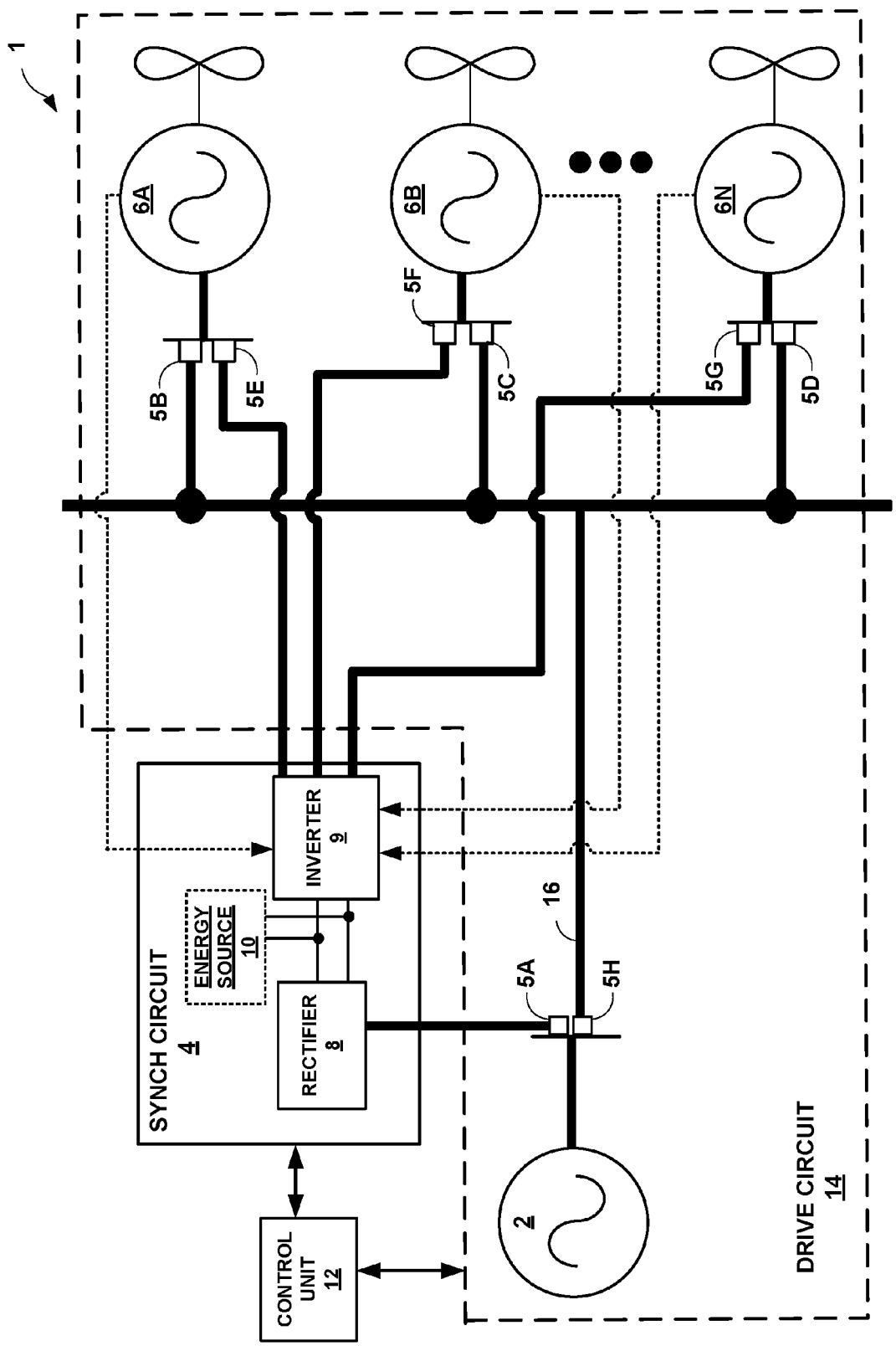
FIG. 1 is a conceptual diagram illustrating an example electric propulsion system configured to maintain synchronization between multiple propulsor motors and a shared power source, in accordance with one or more aspects of the present disclosure.

FIG. 1 is a conceptual diagram illustrating system 1 as an example electric propulsion system configured to maintain synchronization between multiple propulsor motors 6A-6N (collectively "motors 6") and a shared power source 2, in accordance with one or more aspects of the present disclosure. Electric propulsion system 1 is a variable frequency, three-phase AC distribution system that may be found on some marine craft or aircraft for distributing electrical power to one or more propulsor motors.

System 1 includes AC drive circuit 14, synchronization ("synch") circuit 4, and control unit 12. AC drive circuit 14 includes AC generator 2, a plurality of propulsor motors 6, and isolation devices 5A-5H (collectively "isolation devices 5"). Synch circuit 4 includes a DC link circuit made up of rectifier 8, inverter 9, and energy source 10.

AC drive circuit 14 distributes the flow of AC electrical power provided by AC generator 2, as the power travels via AC power bus 16, for simultaneously driving the plurality of propulsor motors 6. AC generator 2 represents any high voltage or high current variable frequency, AC power source for use in an electric propulsion system such as system 1. For example, AC generator 2 may be a turboshaft generator driven by an engine or other type of machine capable of producing electrical power to drive one or more propulsor motors, such as motors 6. In some examples, AC generator 2 may have independent sets of windings which are dedicated to each of motors 6 (essentially one machine per motor 6) or which are dedicated to subset of the motors 6. In other examples, AC generator 2 has only a shared set of windings associated with all of motors 6.

Each of the plurality of propulsor motors 6 represent any type of motor for receiving AC electrical power provided by an electric propulsion system. Motors 6 are shown in FIG. 1 as being propulsion motors for an aircraft or marine craft, for example, for driving propellers. Motors 6 may include additional sensors and/or feedback circuitry for providing information (e.g., voltage, current, speed, frequency, phased, etc.) back to the components of system 1 that are used to control motors 6, such as control unit 12 and inverter 9 of synch circuit 4.

AC power bus 16 is a variable frequency, AC electrical bus that is configured to distribute the electrical current produced by AC generator 2 to each of motors 6. Isolation devices 5 represent isolation devices that are selectively controllable for isolating the various components of system 1 from bus 16. That is, isolation devices 5 are configurable for blocking voltages, interrupting currents and physically isolating conductors at the various components of system 1 that receive power from bus 16.

Examples of isolation devices 5 include power breakers, switches, converters, or any other type of electrical isolation device that is configurable for electrically coupling, and electrically de-coupling (e.g., connecting and disconnecting), an electrical component to and from an electrical bus.

For instance, isolation device 5C may include one or more switches that when switched-on, electrically couple the electrical inputs of motor 6B to power bus 16 for receiving AC electrical power from AC generator 2. When switched-off, the one or more switches of isolation device 5C may electrically de-couple the electrical inputs to motor 6B from power bus 16 to prevent motor 6B from receiving AC electrical power from AC generator 2.

In some examples, isolation devices 5 are configurable by control unit 12 to electrically isolate AC generator 2 from any single one of propulsor motors 6 while synchronization circuit 4 synchronizes the isolated propulsor motor 6 with AC generator 2. In addition, isolation devices 5 are further configurable by control unit 12 to electrically couple AC generator 2 to each of the plurality of propulsor motors 6, other than a single propulsor motor 6 that is being synchronized by synch circuit 4, while synchronization circuit 4 synchronizes the single propulsor motor 6 with AC generator 2. For example, to synchronize motor 6A using synch circuit 4, while also powering motors 6B-6N with AC generator 2, control unit 12 may enable isolation device 5H to send power from generator 2 to power bus 16 and also enable or switch-on isolation devices 5A, 5E, 5C, and 5D, while disabling isolation devices 5B, 5F, and 5G.

Control unit 12 is configured to control how and when system 1 distributes, and refrains from distributing, power from AC generator 2 to motors 6. In controlling the distribution of power from AC generator 2 to each of motors 6, control unit 12 may at times selectively engage synch circuit 4 with any one of the individual motors 6, when that motor 6 becomes out-of-synch with AC generator 2. Said differently, control unit 12 may maintain synchronicity between each of motors 6 and AC generator 2 by selectively engaging synchronization circuit 4, with an individual one of propulsor motors 6, in response to determining that the individual propulsor motor 6 is not synchronized (also referred to herein as being "unsynchronized") with AC generator 2.

Control unit 12 is shown as, generally, being operatively coupled to all of the components of system 1, including AC drive circuit 14, synch circuit 4. Although not specifically shown in FIG. 1, control unit 12 may also be operatively coupled to each of the individual components of synch circuit 4 and AC drive circuit 14, including AC generator 2, one or more of motors 6, one or more of isolation devices 5, rectifier 8, inverter 9, and energy source 10. In other words, control unit 12 may provide and/or receive signals and information, to and/or from each of the different components 2, 4, 5, 6, 8, 9, 10, and 14 of system 1, and any other components required to cause system 1 to distribute, and refrain from distributing, power from AC generator 2 to motors 6. For example, control unit 12 may communicate with other control modules, such as a control module associated with AC generator 2 to coordinate speeds and potential load dynamics with AC generator 2 during the synchronization.

Control unit 12 may comprise any suitable arrangement of hardware, software, firmware, or any combination thereof, to perform the techniques attributed to control unit 12 herein. Examples of control unit 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When control unit 12 includes software or firmware, control unit 12 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, control unit 12 may include a memory configured to store data. The memory may include any volatile or non-volatile media, such as a random access memory (RAM), read only memory (ROM), non-volatile RAM (NVRAM), electrically erasable programmable ROM (EE-PROM), flash memory, and the like. In some examples, the memory may be external to control unit 12 (e.g., may be external to a package in which control unit 12 is housed).

Although control unit 12 is generally described as being the primary unit for controlling each of the components of system 1 for performing the techniques described herein, in some examples, the individual components of drive circuit 14 and/or synch circuit 4, may include additional functionality for performing some or all of the operations described below with respect to control unit 12. For example, a combination of one or more of rectifier 8, inverter 9, energy source 10, isolation devices 5, AC generator 2, and motors 6 may include means for engaging only a single propulsor motor 6 with synchronization circuit 4 in response to determining that the single propulsor motor 6 is unsynchronized with AC generator 2, and responsive to determining that the single propulsor motor 6 is synchronized with AC generator 2, means for disengaging the single propulsor motor 6 from synchronization circuit 4.

In some examples, control unit 12 is further configured to maintain synchronicity between a single propulsor motor 6 and AC generator 2 by disengaging synchronization circuit 4 from the single propulsor motor 6 after synchronization circuit 4 synchronizes the single propulsor motor 6 with AC generator 2. In other words, when synch circuit 4 has finished bringing an out of synch motor 6 up to speed with AC generator 2, control unit 12 may sense that the individual motor is in-synch, disengage synch circuit 4 from that individual motor 6, and electrically re-couple the individual motor 6 with AC power bus 16.

For example, to engage synch circuit 4 with motor 6A, control unit 12 may initially configure isolation device 5A to electrically couple synch circuit 4 to AC power bus 16 in addition to configuring isolation device 5B to electrically de-couple motor 6A from AC power bus 16. Subsequently, control unit 12 may complete the engagement of synch circuit 4 with motor 6A by configuring isolation device 5E to electrically couple motor 6A to synch circuit 4.

Conversely, to disengage synch circuit 4 from motor 6A, control unit 12 may initially configure isolation device 5E to electrically de-couple motor 6A from synch circuit 4. Subsequently, control unit 12 may complete the disengagement of synch circuit 4 with motor 6A by configuring isolation device 5A to electrically de-couple synch circuit 4 from AC power bus 16 and in addition to configuring isolation device 5B to electrically couple motor 6A to AC power bus 16.

In some examples, the techniques and circuits may be applicable for both fixed and variable speed power sources and both fixed and variable pitch propellers or fans. Control unit 12 may manage the variable pitch levels and variable speed levels when determining whether motors 6 and AC generator 2 are synchronized or not.

If variable pitch is available on an aircraft, synchronization circuit 4 may coordinate with propeller pitch controls of propulsors 6 during synchronization and startup, and also under windmilling conditions (e.g., when resynching during flight).

Control unit 12 may coordinate with other controllers, such as power source controls, and other controllers of system 1 (not shown) for obtaining appropriate operating speeds of AC generator 2, and where applicable, the propeller pitch if variable pitch is available for propulsors 6. For example, control unit 12 may obtain a specific generator speed during startup that is preferable for synchronization and startup time.

Synch circuit 4 is configured to synchronize a single one of propulsor motors 6, at a time, with AC generator 2. In some examples, control unit 12 and/or synch circuit 4 will engage synch circuit 4 with each of motors 6 sequentially to assist system 1 during start up. In addition, control unit 12 and/or synch circuit 4 may in some examples configure synch circuit 4 for providing a synchronizing signal (e.g., to insert damping) to individual or multiple propulsors motors 6 to maintain synchronicity with AC generator 2.

Synch circuit 4 includes a low power DC link circuit made up of low power electronics including rectifier 8 and inverter 9 for sequentially starting and/or synchronizing one individual motor 6 with AC drive circuit 14 at a time. The DC link circuit of synch circuit 4 is low-power and therefore has a sufficient power rating for driving only a single propulsor motor 6 at a time. That is, unlike other electric propulsion systems that may rely on multiple high-power synch circuits (e.g., one for each propulsor motor), system 1 may include only one, low-power synch circuit 4. The DC link circuit of synch circuit 4 can synchronize each of motors 6 with AC generator 2, however, synch circuit 4 is sized to be able to synchronize only one of motors 6 with AC generator 2 at a time.

In some examples, synch circuit 4 may be configured to assist system 1 in maintaining stability by applying temporary and intermittent damping to one of motors 6. In this example, the one of motors 6 that is to be stabilized need not be isolated from AC power bus 16. Instead, the to-be-stabilized motor 6 is driven by AC power coming from both synch circuit 4 and AC generator 2. For example, consider the example where motor 6A needs stabilization. Control unit 12 may enable isolation devices 5A and 5E, while isolation device 5B is enabled, such that motor 6A is driven by the output of synch circuit 4 (e.g., the synchronizing or dampening signal) and the AC electrical power produced by AC generator 2. In this way, system 1 may configure synch circuit 4 and AC generator 2 to work in parallel. Note, in order to work in parallel this way, AC generator 2 may require an independent set of windings dedicated to each of motors 6 (essentially one machine per propulsor). In some examples, the components of synch circuit 4 may be sized to support the synchronization of multiple motors 6 simultaneously.

Rectifier 8 of the DC link circuit of synch circuit 4 is configured to provide DC electrical power, based on the AC electrical power delivered via AC power bus 16 by AC generator 2, to inverter 9. Rectifier 8 may comprise any suitable combination of electronics and circuitry needed to produce DC electrical power that is reflective of the characteristics of the AC electrical power being delivered by AC generator 2. The DC electrical power produced by rectifier 8 may provide an indication to control unit 12 and/or inverter 9 as to the frequency, phase, voltage, and/or current associated with a synchronizing signal that synch circuit 4 needs to produce in order to drive one of motors 6 back in-synch with AC generator 2.

Inverter 9 is configured to output synchronizing electrical power, based on the DC electrical signal received from rectifier 8 and/or the DC electrical signal received from AC power bus 16, for driving a single one of propulsor motors 6 in-phase with AC generator 2. Inverter 9 may vary the phase, frequency, voltage amplitude, current amplitude, and/or other characteristics of the synchronizing power in order to drive an out-of-synch motor 6, back in-synch with AC generator 2. For example, inverter 9 may receive information from control unit 12 and/or directly from an out-of-synch one of motors 6 that indicates the speed of the out-of-synch motor. Inverter 9 may vary the synchronizing power characteristics until the speed information indicates that the out-of-synch motor is back in-synch with AC generator 2.

In some examples, the DC link circuit of synch circuit 4 further includes energy source 10 for stabilizing the DC electrical power that passes between rectifier 8 and inverter 9 (e.g., for temporary source loss ride through). For example, during potential loss conditions associated with AC electrical power being delivered by AC generator 2, energy source 10 may provide synchronizing power that prevents the loss conditions from introducing anomalies in the power being output from synch circuit 4 to AC power bus 16. Energy source 10 may also provide some level of redundancy for recovery from other turbo generator or distribution system failures.

In some examples, when one of propulsor motors 6 is out-of-synch with AC generator 2, synchronization circuit 14 may be configured to synchronize the out-of-synch propulsor motor 6 with AC generator 2 by outputting synchronizing electrical power, that is derived from the AC electrical power delivered by the AC generator, to the single propulsor motor for synchronizing the single propulsor motor with the AC generator. For example, consider the example where motor 6A is out-of-synch (e.g., in phase, speed, etc.) with AC generator 2. Inverter 9 may generate synchronizing power based on the DC signal received from rectifier 8 or AC bus, and output the synchronizing power to motor 6A, to bring motor 6A back in-synch with AC generator 2.

In some examples, when one of propulsor motors 6 is out-of-synch with AC generator 2, synchronization circuit 14 may be configured to synchronize the out-of-synch propulsor motor 6 with AC generator 2 by refraining from outputting the synchronizing electrical power in response to determining the single propulsor motor is operating at a speed that satisfies an operating speed threshold. For example, inverter 9 may receive information from motor 6A (or from control unit 12) indicating the current speed of motor 6A. Based on the speed information, inverter 9 may alter the synchronizing power being output to bus 16 to speed up or slow down the speed of motor 6A, until motor 6A, comes back in-synch or otherwise, back in-line, with AC generator 2. In some examples, based on the speed information, inverter 9 may alter the synchronizing power in coordination with a variable pitch mechanism that may be used to impart synchronization to motor 6A (e.g., via wind milling techniques).

In some examples, when one of propulsor motors 6 is out-of-synch with AC generator 2, synchronization circuit 14 may be configured to synchronize the out-of-synch propulsor motor 6 with AC generator 2 by refraining from outputting any stabilizing electrical power to each of the plurality of propulsor motors, other than the one single propulsor motor that is out-of-synch. Said differently, although inverter 9 may generate synchronizing power based on the DC signal received from rectifier 8 or ac bus 16, and output the synchronizing power to motor 6A, to bring motor 6A back in-line with AC generator 2, the synchronizing power being generated and output from synch circuit 4 may be insufficient for driving any motors 6, that may also be out of synch. In this way, the size and power requirements of synch circuit 4 can remain relatively small and as such, be more readily usable by electric propulsion systems of lighter, smaller, and cheaper aircraft and marine craft.

The operations of control unit 12, synch circuit 4, and other components of system 1 depend on the state of motors 6. For example, when one of motors 6 becomes out-of-synch with AC generator 2, the control unit 12 may first isolate that motor 6 from the variable frequency AC power bus 16 and then engage synch circuit 4 with that motor 6 to bring that motor 6 back in synch with AC generator 2. Control unit 12 and/or synch circuit 4 may gather information (e.g., data) regarding position, speed, voltage, frequency and/or phase associated with that motor 6 as synch circuit 4 drives that motor 6, until the speed of that motor 6 is synchronized with AC generator 2. In other words, for synchronization to occur, control unit 12 may synchronize three characteristics of motors 6 and AC generator 2. The three things that need to be the same are voltage, phase and frequency (speed). For example even if one of motors 6 is in phase with AC generator 2, if voltage levels between that motor 6 and generator 2 are not the same, the two devices may not be considered to be in-synch.

Once the speed, phase, voltage, and/or frequency of that motor 6 is synchronized with AC generator 2, control unit 12 and/or synch circuit 4 may disengage synch circuit 4 from that motor 6 while also reengaging that motor 6 with AC power bus 16. Control unit 12 and/or synch circuit 4 may repeat the forgoing steps for each of motors 6 to bring each of motors 6 into synchronization with AC generator 2.

In this way, the synch circuit described herein need not be sized to provide DC power to all propulsor motors of an electric propulsion system at once. As a result of being sized to provide DC power to only a single propulsor motor at a time, the synch circuit described herein may greatly reduce the weight of power electronics of the electric propulsion system which are necessary to drive the propulsors and may also reduce power electronic losses. The synch circuit may also provide a centralized electrical means for re-syncing motors (e.g., after a torque event). By using a single synchronization circuit, the mass (e.g., size, weight, etc.) of the example propulsion system may be a fraction of the mass of other electric propulsion systems that rely on multiple synchronization circuits. In addition, the example propulsion system may cost less and be easier to maintain than other systems.

Figure 2:
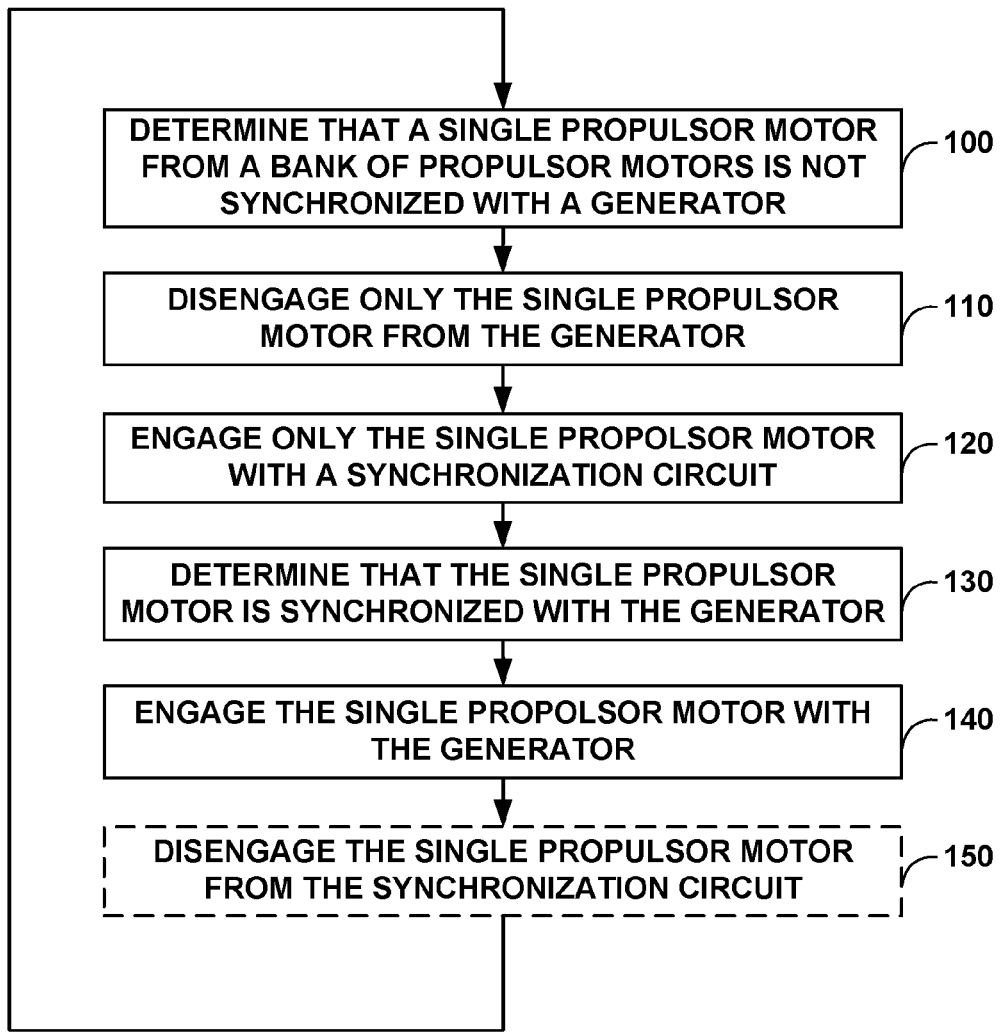
FIG. 2 is a flow chart illustrating example operations performed by an example control unit configured to maintain synchronization between the multiple propulsor motors and the shared power source of the example electric propulsion system of FIG. 1, in accordance with one or more aspects of the present disclosure.

FIG. 2 is a flow chart illustrating example operations performed by control unit 12 as an example control unit configured to maintain synchronization between multiple propulsor motors 6 and shared power source 2 of electric propulsion system 1 of FIG. 1, in accordance with one or more aspects of the present disclosure. FIG. 2 is described below in the context of system 1 of FIG. 1.

In operation, control unit 12 may determine that a single propulsor motor from a bank of propulsor motors is not synchronized with a generator (100). For example, during normal operations, motor 6A may fall out of synchronicity with AC generator 2 gradually (e.g., due to inherent instabilities in system 1) or rapidly (e.g., due to torque transients caused by wind gusts, debris, aerodynamic separation, and the like). Control unit 12 may receive information from AC generator 2 and/or motor 6A that indicates when motor 6A has slowed, sped up, become out of phase with, or otherwise become out-of-synch with AC generator 2.

Control unit 12 may analyze the speed, voltage, frequency, and/or phase associated with each individual motor 6 to determine whether that motor is out-of-synch, or back in-synch, with AC generator 2. For example, control unit 12 may receive information from each of motors 6 that indicates a speed, voltage, frequency, and/or phase associated with each individual one of motors 6. In some examples, control unit 12 may determine the speed of one of motors 6 based on a current being drawn by that motor 6. In other words, control unit 12 may infer the speed of one of motors 6 based on a current level associated with that motor 6. For instance, a higher current level may indicate that one of motors 6 is operating at a faster speed whereas a lower current or no current being drawn may indicate that the one of motors 6 is operating at a slower or zero speed.

Responsive to determining that the single propulsor motor from the bank of propulsor motors is not synchronized with the generator and prior to engaging only the single propulsor motor with the synchronization circuit, control unit 12 may disengage only the single propulsor motor from the generator (110). Said differently, prior to engaging synch circuit 4 with motor 6A, control unit 12 may disable isolation device 5B to electrically decouple motor 6A from AC power bus 16 before enabling isolation device 5A or 5E to engage motor 6A with synch circuit 14.

Control unit 12 may determine that a single propulsor motor is synchronized with AC generator 2 in response to determining that the speed of that motor 6 satisfies an operating speed threshold of motors 6 and conversely, may determine that the single propulsor motor is unsynchronized with AC generator 2 in response to determining that the speed does not satisfy the operating speed threshold of motors 6. Responsive to determining that motor 6A of system 1 is unsynchronized with AC generator 2, control unit 12 may engage only the single propulsor motor with a synchronization circuit of the electric propulsion system that is shared by the bank of propulsor motors (120). That is, control unit 12 may task synch circuit 4 to either stabilize or regain synchronicity between motor 6A and AC generator 2. While isolation device 5H is enabled to provide power to bus 16, control unit 12 may enable isolation device 5A to electrically couple rectifier 8 of synch circuit 14 with AC power bus 16 and enable isolation device 5E to electrically couple the output of inverter 9 of synch circuit 14 with motor 6A.

In some examples, control unit 12 may engage only the single propulsor motor with the synchronization circuit by configuring a plurality of isolation devices to electrically isolate the single propulsor motor from the generator while maintaining electrical coupling between the generator and each of the propulsor motors from the bank of propulsor motors, other than the single propulsor motor. In other words, as control unit 12 enables isolation devices 5A and 5B and disables isolation device 5E for engaging motor 6A with synch circuit 4, control unit 12 may keep isolation devices 5F and 5G disabled and keep isolation devices 5C, 5D, and 5H enabled. In this way, control unit 12 may configure motors 6B-6N to be disengaged from synch circuit 4 and engaged with AC generator 2 while synch circuit 4 drives motor 6A back in-synch with AC generator 2.

Control unit 12 may determine that the single propulsor motor is synchronized with the generator (130). For example, at some later time, after synch circuit 14 begins driving motor 6A with the synchronizing power, control unit 12 may receive information (e.g., indicating a current, a speed, etc.) associated with motor 6A and deem motor 6A to be back-in-synch with AC generator 2.

Responsive to determining that the single propulsor motor is synchronized with the generator, control unit 12 may engage the single propulsor motor with the generator (140). For example, control unit 12 may bring motor 6A back online with AC generator 2 by enabling isolation device 5B to electrically couple motor 6A with AC power bus 16

In some examples, responsive to determining that the single propulsor motor is synchronized with the generator and after engaging the single propulsor motor with the generator, control unit 12 may disengage the single propulsor motor from the synchronization circuit (150). For example, control unit 12 may disable isolation device 5E to electrically decouple the output of inverter 9 of synch circuit 14 from motor 6A. If control unit 12 deems all other motors 6 are in synch with AC generator 2, control unit 12 may also disable isolation device 5A to electrically decouple rectifier 8 of synch circuit 4 from AC power bus 16.

FIGS. 3A-3D are conceptual diagrams illustrating electric propulsion system 1 of FIG. 1, during start-up and while electric propulsion system 1 synchronizes propulsor motors 6 with shared power source 2, in accordance with one or more aspects of the present disclosure. Similarly, FIGS. 4A-4D are conceptual diagrams illustrating electric propulsion system 1 of FIG. 1, during run-time and while electric propulsion system 1 synchronizes propulsor motors 6 with shared power source 2, in accordance with one or more aspects of the present disclosure.

FIGS. 3A-3D and 4A-4D are described below in the context of system 1 of FIG. 1 and operations 100-150 of FIG. 2. Throughout FIGS. 3A-3D and 4A-4D isolation devices 5 are shown as either being shaded "black" boxes to indicate when the isolation devices 5 are enabled or closed (e.g., and conducting current) or unshaded "white" boxes to indicate when the isolation devices 5 are disabled or open (e.g., and not conducting current)

Figure 3A:
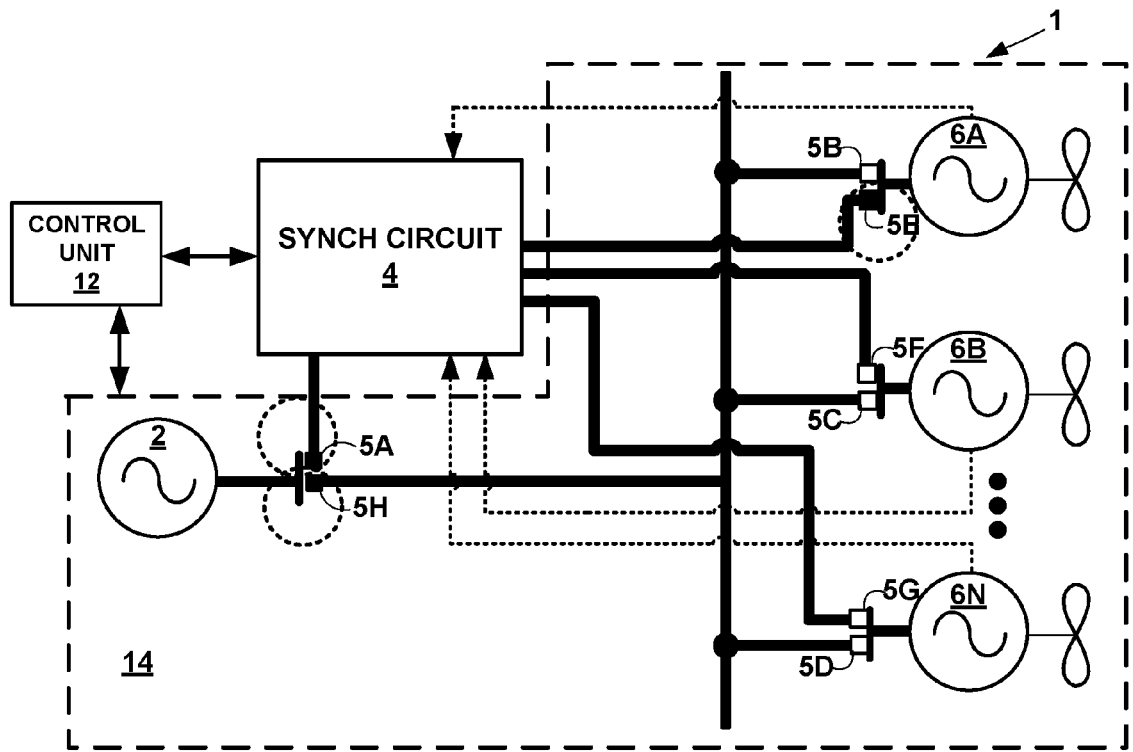
FIGS. 3A-3D are conceptual diagrams illustrating the example electric propulsion system of FIG. 1, during start-up and while the example electric propulsion system synchronizes the multiple propulsor motors with the shared power source, in accordance with one or more aspects of the present disclosure.

FIGS. 3A-3D each represent a different phase of a start-up sequence in which synch circuit 4 is sequentially engaged in supporting stability of each motor 6 in turn until all have been synched. FIG. 3A shows system 1 during the initial phased of a sequential start-up of motors 6. At start-up, each of motors 6 is not being driven by AC generator 2 and isolation devices 5B-5D and 5F-5G are disabled to prevent current from AC generator 2 reaching each of motors 6 all the while isolation device 5H may be enabled such that current from AC generator 2 is out at bus 16. Control unit 12 may engage synch circuit 4 with motor 6A to begin bringing motor 6A up to speed by enabling isolation devices 5A and 5E while continuing to isolate each of motors 6B-6N from synch circuit 4.

Figure 3B:
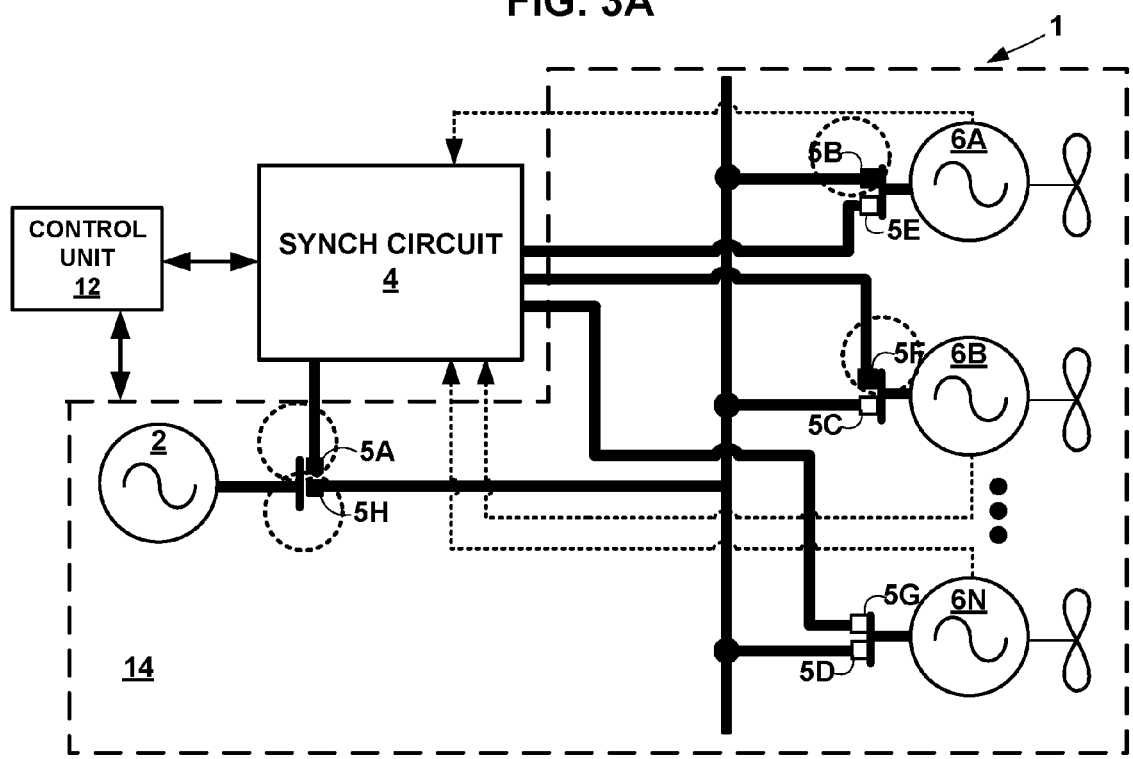

FIG. 3B shows system 1 during the subsequent phase of a sequential start-up of motors 6, immediately following the initial phase shown in FIG. 3A. In FIG. 3B, control unit 12 has determined that synch circuit 4 has finished bringing motor 6A up to speed. Control unit 12 may engage motor 6A with AC power bus 16 by enabling isolation device 5B, then disengage motor 6A from synch circuit 4 by disabling isolation device 5E. With motor 6A up-to-speed and being driven by AC generator 2, control unit 12 moves on to bring motor 6B up-to-speed during yet another subsequent phase of the sequential start-up of motors 6. Control unit 12 may enable isolation device 5F thereby engaging motor 6B with synch circuit 4 so that synch circuit 4 can bring motor 6B in-synch with AC generator 2.

Figure 3C:
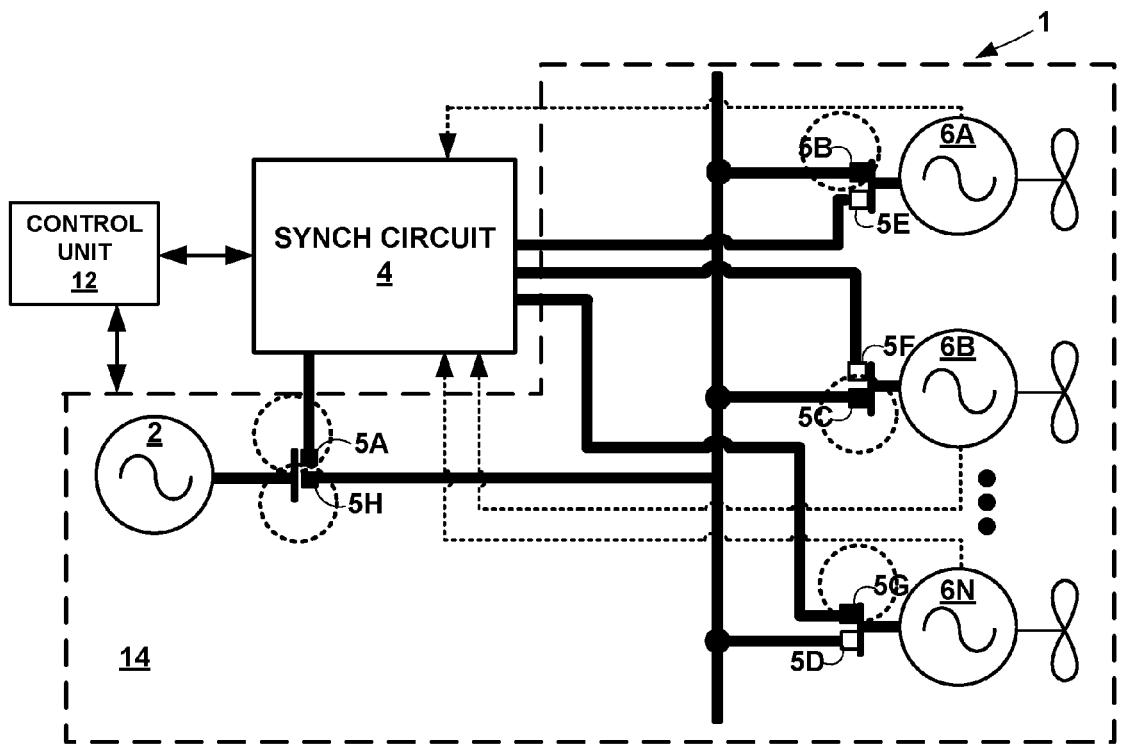

In FIG. 3C, control unit 12 has determined that synch circuit 4 has finished bringing motor 6B up to speed and engages motor 6A with AC power bus 16 by enabling isolation device 5C and disengages motor 6B from synch circuit 4 by disabling isolation device 5F. With motors 6A and 6B now up-to-speed and being driven by AC generator 2, control unit 12 moves on to bring the other motors 6 up-to-speed, sequentially, and one at a time. Control unit 12 may finish the startup sequence by enabling isolation device 5G thereby engaging motor 6N with synch circuit 4 so that synch circuit 4 can bring motor 6N in-synch with AC generator 2.

Figure 3D:
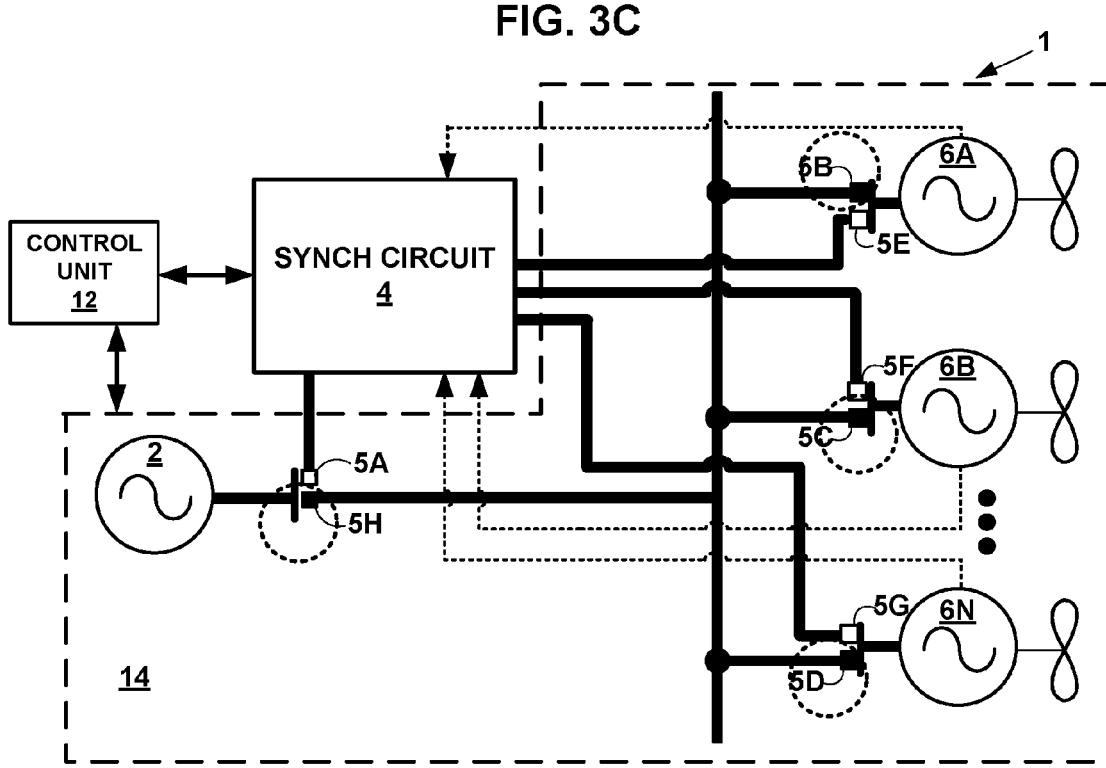

In FIG. 3D, control unit 12 finishes the start-up sequence after determining that synch circuit 4 has finished bringing motor 6N up to speed. Control unit 12 engages motor 6N with AC power bus 16 by enabling isolation device 5N and disengages motor 6N from synch circuit 4 by disabling isolation device 5A and 5G. As a result, the start-up sequence is complete, and each of motors 6 is driven by AC generator 6.

Figure 4A:
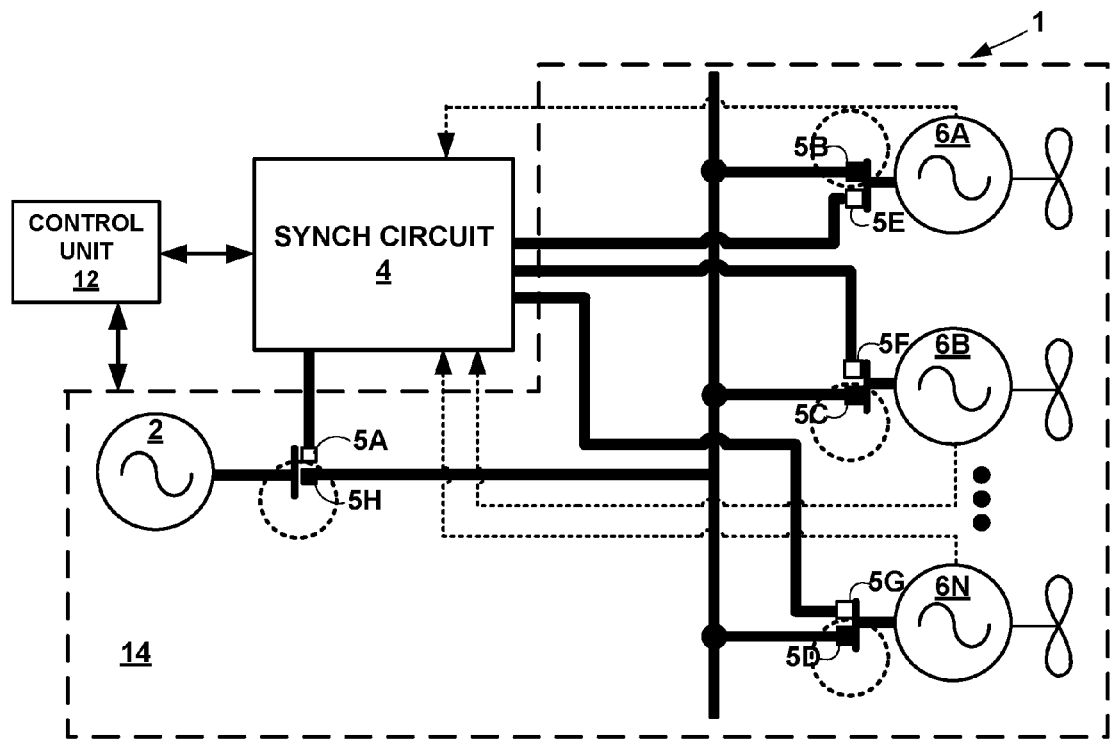
FIGS. 4A-4D are conceptual diagrams illustrating the example electric propulsion system of FIG. 1, during run-time and while the example electric propulsion system synchronizes the multiple propulsor motors with the shared power source, in accordance with one or more aspects of the present disclosure.

FIGS. 4A-4D each represent a different moment in time when synch circuit 4 may be engaged in supporting stability and synchronization of each motor 6 during operations of system 1. FIG. 4A shows a moment during normal operation in which synch circuit 4 is not engaged with any of motors 6 and instead, each of motors 6 is being driven by AC power bus 16. Control unit 12 may drive each of motors 6 with AC generator 2 by enabling each of isolation devices 5B-5D, and 5H while disabling each of isolation devices 5A and 5E-5G.

Figure 4B:
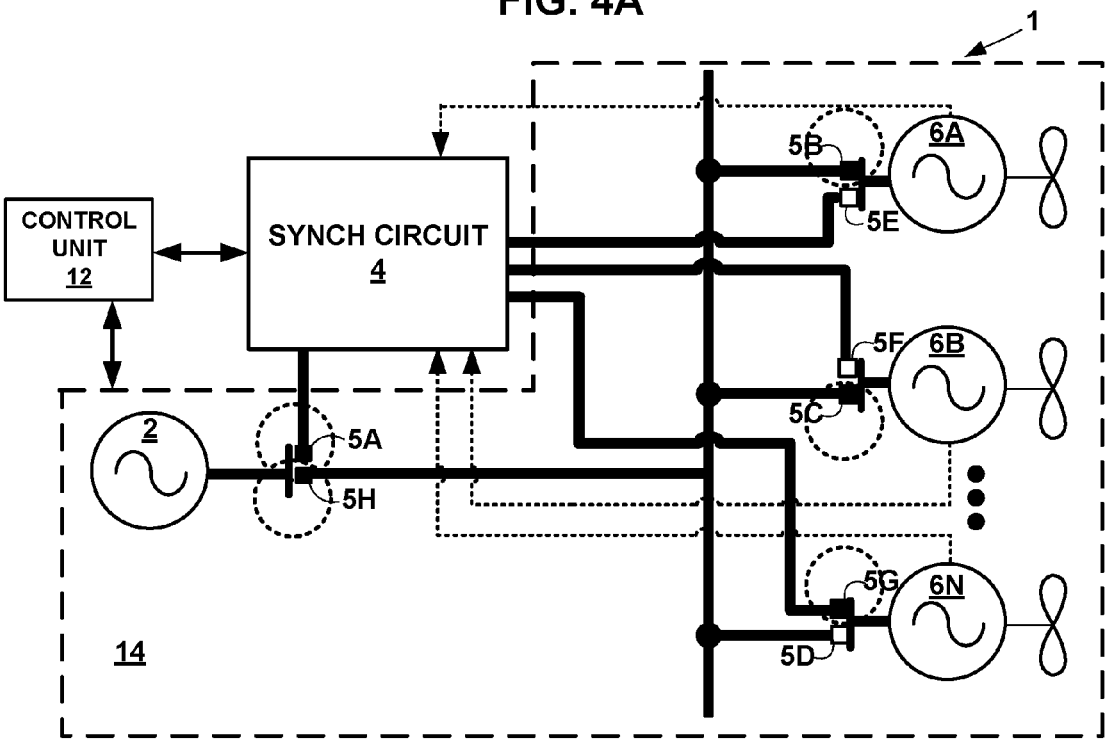

Eventually, control unit 12 and/or synch circuit 4 may receive information from motor 6N indicating that motor 6N has fallen out-of-synch with AC generator 2. FIG. 4B shows that control unit 12 may engage synch circuit 4 with motor 6N to bring motor 6N back in synch by enabling isolation devices 5A and 5G and disabling isolation device 5D.

Figure 4C:
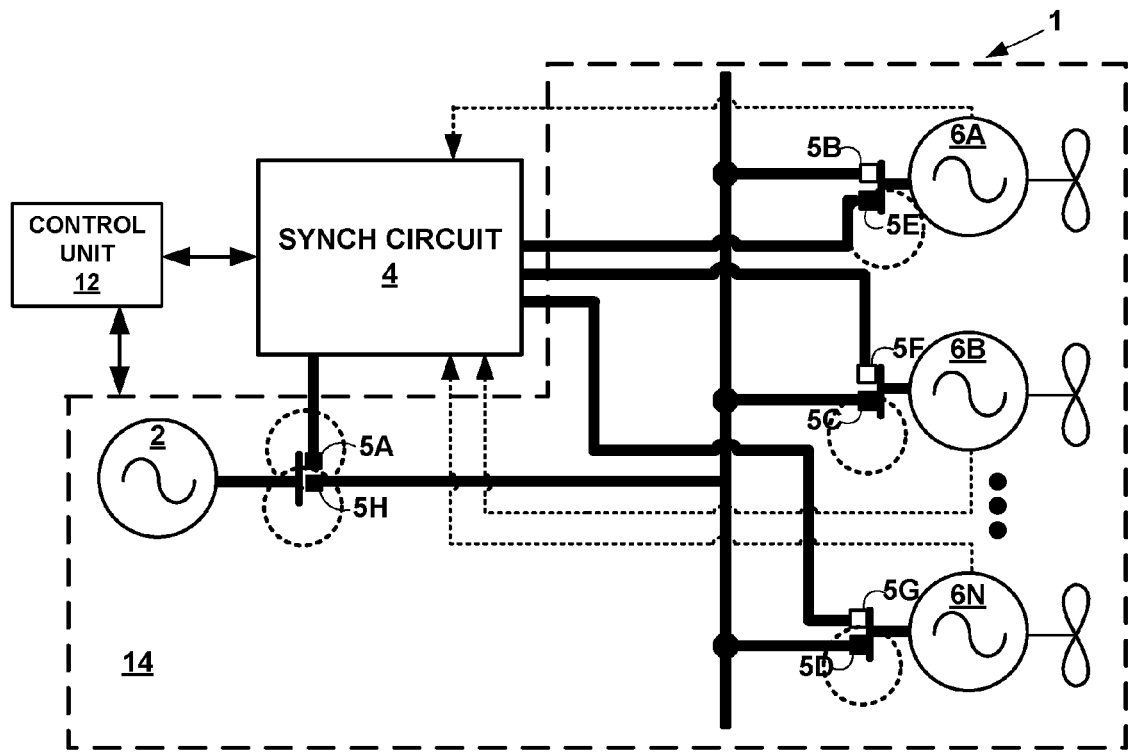

In FIG. 4C, motor 6N is back in synch with AC generator 2 and as a result, control unit 12 may re-enable isolation device 5D to drive motor 6N with AC generator 2 and disable isolation device 5G. Control unit 12 and/or synch circuit 4 may receive information from motor 6A indicating that motor 6A has fallen out-of-synch with AC generator 2 and control unit 12 may engage synch circuit 4 with motor 6A to bring motor 6A back in synch by enabling isolation devices 5A and 5E and disabling isolation device 5B.

Figure 4D:
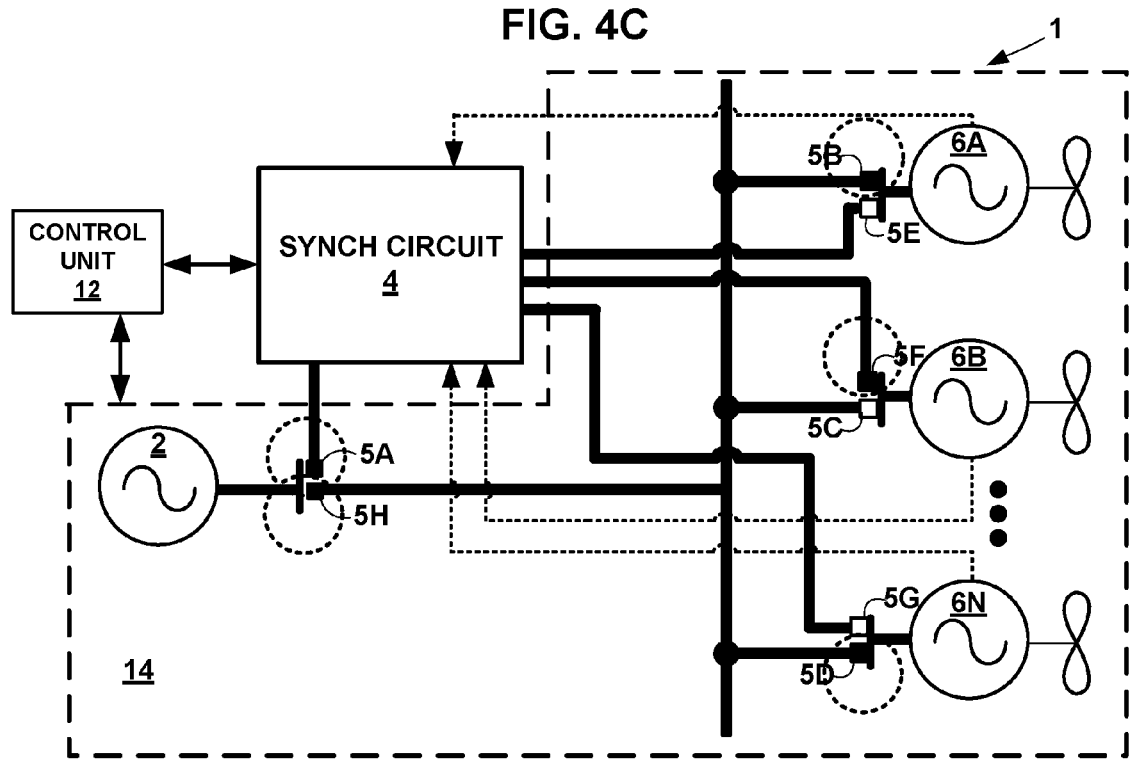

And in FIG. 4D, motor 6A is back in synch with AC generator 2 and as a result, control unit 12 may re-enable isolation device 5B to drive motor 6A with AC generator 2 and disable isolation device 5E. Control unit 12 and/or synch circuit 4 may further receive information from motor 6B indicating that motor 6B has fallen out-of-synch with AC generator 2 and control unit 12 may engage synch circuit 4 with motor 6B to bring motor 6B back in synch by enabling isolation devices 5A and 5F and disabling isolation device 5C. Eventually, when motor 6B is back in synch with AC generator 2, control unit 12 may re-enable isolation device 5C and disable isolation device 5F to once again drive motor 6B with AC generator 2.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An electric propulsion system comprising:
   an AC drive circuit that includes:
      a plurality of propulsor motors;
      an AC power bus; and
      an AC generator that delivers AC electrical power to the AC power bus for simultaneously driving the plurality of propulsor motors;

a synchronization circuit configured to individually synchronize, with the AC generator, a single propulsor motor from the plurality of propulsor motors, one at a time; and a control unit configured to:
determine whether the single propulsor motor is not synchronized with the AC generator; and
maintain synchronicity between the single propulsor motor and the AC generator by engaging the synchronization circuit with the single propulsor motor in response to determining that the single propulsor motor is not synchronized with the AC generator.

2. The electric propulsion system of claim 1, wherein the synchronization circuit is configured to synchronize the single propulsor motor with the AC generator by outputting synchronizing electrical power, that is derived from the AC electrical power delivered by the AC generator, to the single propulsor motor for driving the single propulsor motor in-phase with the AC generator.

3. The electric propulsion system of claim 2, wherein the synchronization circuit is configured to synchronize the single propulsor motor with the AC generator by refraining from outputting the synchronizing electrical power in response to determining the single propulsor motor is operating at a speed that satisfies an operating speed threshold.

4. The electric propulsion system of claim 2, wherein the synchronization circuit is further configured to synchronize the single propulsor motor with the AC generator by refraining from outputting synchronizing electrical power to each of the plurality of propulsor motors, other than the single propulsor motor.

5. The electric propulsion system of claim 1, wherein the synchronization circuit is configured to synchronize the single propulsor motor with the AC generator by adjusting, with the synchronizing electrical power, a frequency of the propulsor motor to be within a tolerance threshold of a frequency of the AC electrical power delivered by the AC generator.

6. The electric propulsion system of claim 1, wherein the synchronization circuit is configured to synchronize the single propulsor motor with the AC generator by adjusting, with the synchronizing electrical power, a phase shift of the propulsor motor to be within a tolerance threshold of a frequency of the AC electrical power delivered by the AC generator.

7. The electric propulsion system of claim 1, wherein the synchronization circuit is configured to synchronize the single propulsor motor with the AC generator by adjusting, with the synchronizing electrical power, a voltage of the propulsor motor to be within a tolerance threshold of a voltage associated with the AC generator.

8. The electric propulsion system of claim 1, wherein the synchronization circuit comprises a DC link circuit that includes a rectifier and an inverter, wherein the rectifier is configured to provide a DC electrical signal, based on the AC electrical power delivered by the AC generator, to the inverter, and the inverter is configured to output synchronizing electrical power, based on the DC electrical signal received from the rectifier or based on the AC bus, for driving the single propulsor motor in-phase with the AC generator.

9. The electric propulsion system of claim 8, further comprising a distributed propulsion system,
wherein the AC generator comprises a shaft driven by an engine, and
wherein the DC link circuit further comprises an energy source for synchronizing the DC electrical signal during potential loss conditions associated with the AC electrical power being delivered by the AC generator.

10. The electric propulsion system of claim 1, wherein the AC drive circuit further includes a plurality of isolation devices that are configurable by the control unit to:
electrically isolate the AC generator from the single propulsor motor while the synchronization circuit synchronizes the single propulsor motor with the AC generator; and
electrically couple the AC generator to each of the plurality of propulsor motors, other than the single propulsor motor, while the synchronization circuit synchronizes the single propulsor motor with the AC generator.

11. The electric propulsion system of claim 1, wherein the control unit is further configured to maintain synchronicity between the single propulsor motor and the AC generator by disengaging the synchronization circuit from the single propulsor motor after the synchronization circuit synchronizes the single propulsor motor with the AC generator.

12. The electric propulsion system of claim 1, wherein the control unit is configured to determine that the single propulsor motor is not synchronized with the AC generator by at least determining that a speed of the single propulsor motor does not satisfy an operating speed threshold of the plurality of motors.

13. The electric propulsion system of claim 1, wherein the control unit is configured to determine that the single propulsor motor is not synchronized with the AC generator by at least receiving information from the single propulsor motor that indicates the single propulsor motor has fallen out-of-synch with the AC generator.

14. The electric propulsion system of claim 1, wherein the synchronization circuit is sized to be able to synchronize only the single propulsor motor from the plurality of propulsor motors at a time.

15. An electric propulsion system comprising:
means for determining that a single propulsor motor from a bank of propulsor motors is not synchronized with a generator;
means for disengaging only the single propulsor motor from the generator;
means for engaging only the single propulsor motor with a synchronization circuit shared by the bank of propulsor motors;
means for determining that the single propulsor motor is synchronized with the generator;
means for engaging the single propulsor motor with the generator; and
means for disengaging the single propulsor motor from the synchronization circuit.

16. A method comprising:
determining whether a single propulsor motor from a bank of propulsor motors of an electric propulsion system is not synchronized with a generator of the electric propulsion system;
responsive to determining that the single propulsor motor is not synchronized with the generator, engaging, by a control unit, only the single propulsor motor with a synchronization circuit of the electric propulsion system that is shared by the bank of propulsor motors; and
responsive to determining that the single propulsor motor is synchronized with the generator, disengaging, by the control unit, the single propulsor motor from the synchronization circuit.

17. The method of claim 16, further comprising:
further responsive to determining that the single propulsor motor from the bank of propulsor motors is not synchronized with the generator and prior to engaging only the single propulsor motor with the synchronization circuit, disengaging, by the control unit, only the single propulsor motor from the generator; and
further responsive to determining that the single propulsor motor is synchronized with the generator, engaging, by the control unit, the single propulsor motor with the generator before disengaging the single propulsor motor from the synchronization circuit.

18. The method of claim 16, further comprising:
determining, by the control unit, a speed associated with the single propulsor motor;
determining, by the control unit, that the single propulsor motor is synchronized with the generator in response to determining that the speed satisfies an operating speed threshold of the bank of propulsor motors; and
determining, by the control unit, that the single propulsor motor is not synchronized with the generator in response to determining that the frequency, voltage and phase do not satisfy the operating speed threshold of the bank of propulsor motors.

19. The method of claim 18, wherein determining the speed associated with the single propulsor motor comprises inferring the speed based on a current level associated with the single propulsor motor.

20. The method of claim 16, wherein engaging only the single propulsor motor with the synchronization circuit comprises configuring a plurality of isolation devices of the electric propulsion system to electrically isolate the single propulsor motor from the generator while maintaining electrical coupling between the generator and each of the propulsor motors from the bank of propulsor motors, other than the single propulsor motor.

* * * * *